United States Patent [19]
Snow et al.

[11] Patent Number: 5,158,153
[45] Date of Patent: Oct. 27, 1992

[54] BOX LUBRICATOR RESERVOIR AND REDUCTION DRIVE MECHANISM

[75] Inventors: John P. Snow, Sagamore Hills; Peter A. Kamis, Willoughby Hills, both of Ohio

[73] Assignee: Lubriquip, Inc., Cleveland, Ohio

[21] Appl. No.: 761,430

[22] Filed: Sep. 17, 1991

[51] Int. Cl.[5] ............................................. F16N 13/18
[52] U.S. Cl. .................................. 184/27.2; 184/6.28; 74/567; 220/315; 417/539
[58] Field of Search .................... 184/6.5, 7.4, 6.12, 184/27.2, 106, 6.28; 123/195 C; 220/4.32, 325, 315; 418/60; 417/539; 74/567

[56] References Cited

U.S. PATENT DOCUMENTS

| | | | |
|---|---|---|---|
| 1,873,442 | 8/1932 | Manzel | 184/27.2 |
| 2,003,389 | 6/1935 | Petrie | 184/27.2 |
| 2,475,836 | 7/1949 | Henrickson et al. | 184/106 |
| 3,563,578 | 2/1971 | Meller | 220/4.32 |
| 3,924,978 | 12/1975 | Loyd, Jr. et al. | 418/60 |
| 4,072,448 | 2/1978 | Loyd, Jr. | 418/60 |
| 4,090,822 | 5/1978 | Mount et al. | 418/60 |
| 4,479,463 | 10/1984 | Curley et al. | 184/106 |
| 4,911,118 | 3/1990 | Kageyama et al. | 123/195 C |
| 5,058,746 | 10/1991 | Morgan, IV | 220/4.32 |

FOREIGN PATENT DOCUMENTS 0269489 2/1928 United Kingdom ............... 184/27.2

OTHER PUBLICATIONS

Manzel Pumping Packages Brochure No. 51020 (8 pages), Jan. 1990.
Mega Industries Mega Model M-55 Lubricator Pumps Brochure (6 pages).
Kipp Drawing D 21426 (1 page). Nov. 1981.

Primary Examiner—Allen M. Ostrager
Assistant Examiner—Alan B. Cariaso
Attorney, Agent, or Firm—Hill, Van Santen, Steadman & Simpson

[57] ABSTRACT

A box lubricator formed from an extruded U-shape having bolt receiving U-shaped channels for mounting a top cover, and bolt or anchor receiving T-shaped channels along a bottom side for alternatively mounting the box to a horizontal or vertical structure, and having support rails extending on an inside surface of the bottom for holding along their length selectively positioned cam supports within the lubricator box. The lubricator box also provides along its length and arranged on an inside surface, screw receiving C-shaped channels for mounting end covers to the U-shaped housing. By providing the T-shaped rails and the C-shaped rails, the U-shaped housing can be cut to any length and retains its ability for mounting top covers, end covers, and mounting the box to external structure. The lubricator box also provides a segmented cam shaft wherein each segment has a short shaft mounted to a cam lobe, each segment having a polygonal male protrusion and a complimentary polygonal female receiver so that the segments may be stacked to form an elongate and flexible cam shaft arrangement.

24 Claims, 5 Drawing Sheets

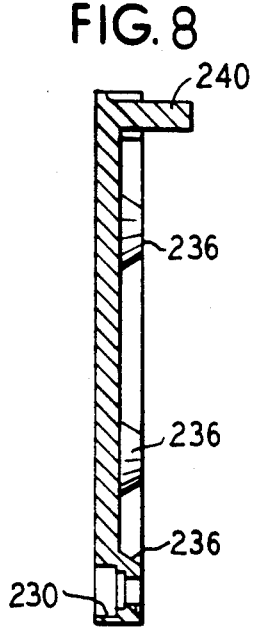
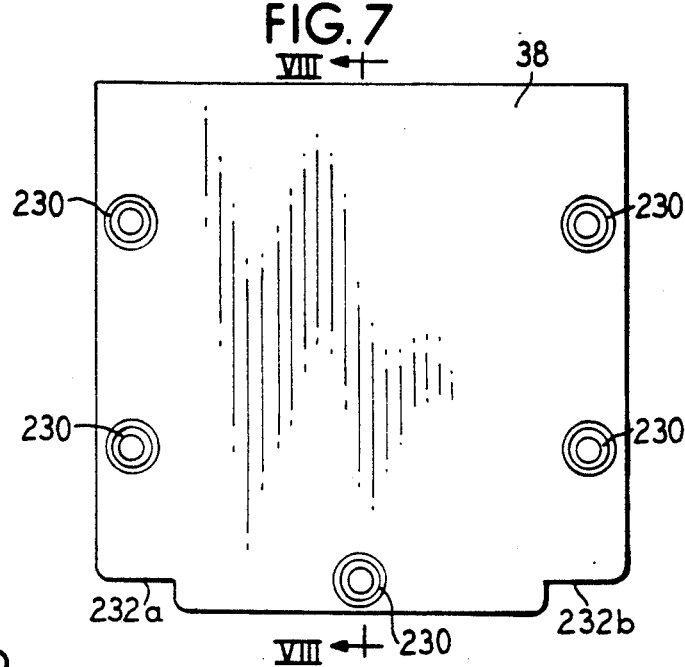
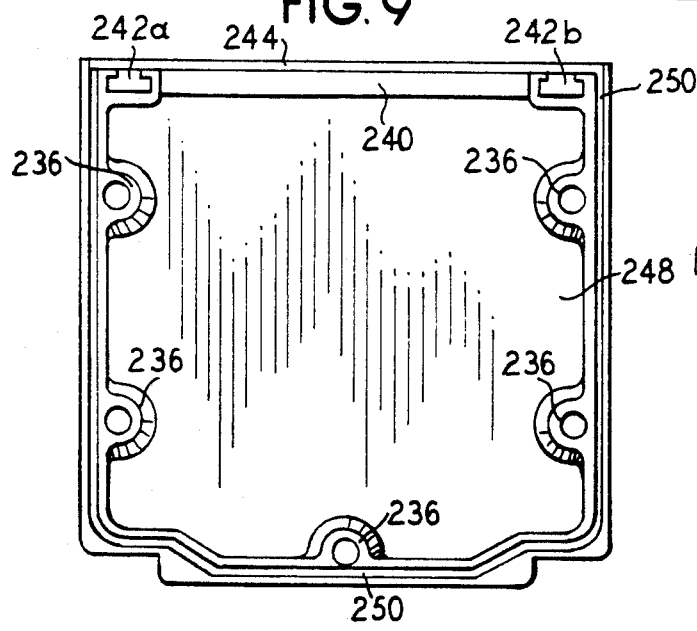
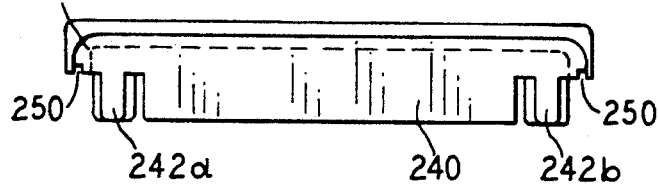
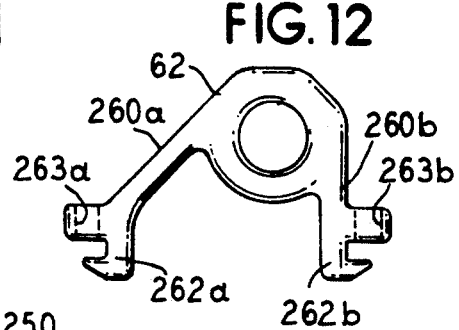

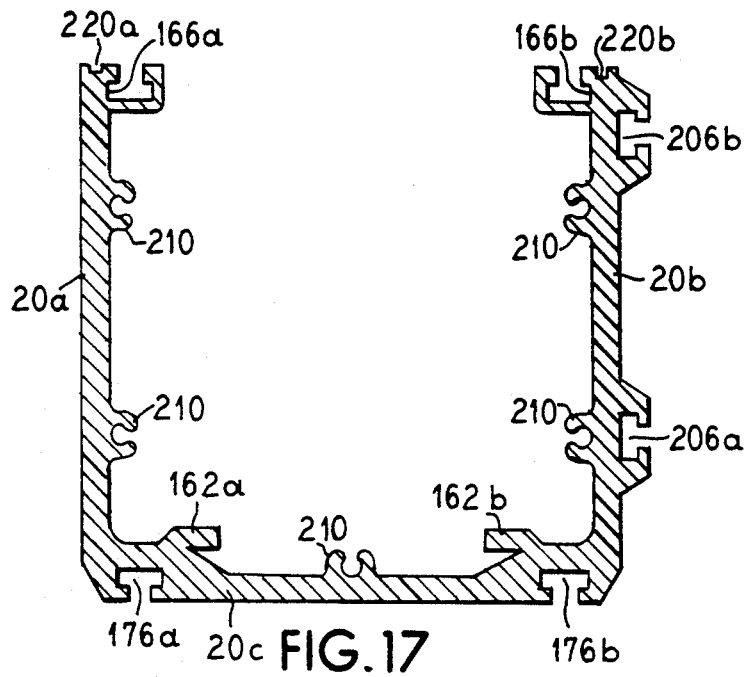
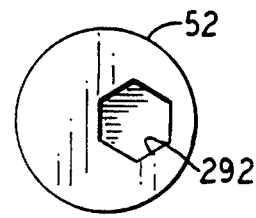
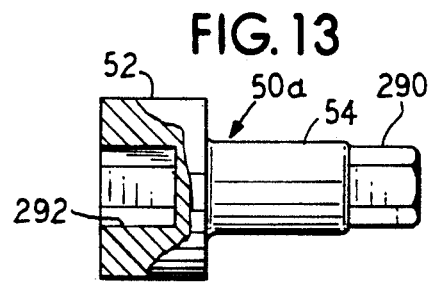
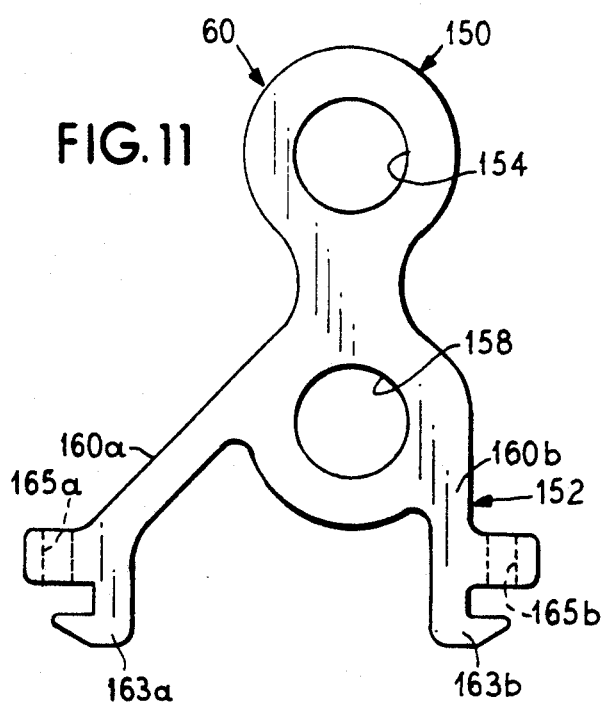
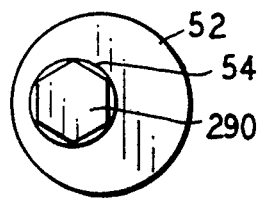

BOX LUBRICATOR RESERVOIR AND REDUCTION DRIVE MECHANISM

BACKGROUND OF THE INVENTION

The box lubricator business for pump-to-point lubrication of compressors and engines has been in existence since the early 1900's. In pump to point box lubricators, one or a plurality of reciprocating lubricator pumps are mounted to a box or reservoir which holds lube oil therein. The pumps have suction tubes extending down into the reservoir to pump away lube oil. The pumps have actuating mechanisms protruding into the box reservoir. A cam shaft arrangement within the box, having rotating cam lobes abutting the actuating mechanisms, causes the reciprocating, pumping action of the pumps. The cam shaft arrangement is rotatably driven by an external motor engaging a drive shaft protruding externally of the box. MANZEL box lubricators from LUBRIQUIP as well as MEGA AND KIPP box lubricators from KLS of Madison, Wisconsin are examples of box lubricators. The boxes for box lubricators were manufactured by forming and welding sheet steel or by sand casting the entire box reservoir. These two methods are still in use today by LUBRIQUIP as well as other companies. Both of these processes require extensive machining to allow for drive shafts, cam shafts and pump mountings to be installed thereon or therethrough.

In an effort to reduce the labor intensive cost of manufacturing under these processes, the Applicants have developed a method of construction which requires reduced machining.

SUMMARY OF THE INVENTION

The present invention utilizes a "U" shaped aluminum extrusion with end covers and a top cover to form a lubricator box or reservoir. The extrusion is provided with guideways in the bottom inside surface for locating and fixing extruded bearing supports for a drive shaft, reduction gears and a cam shaft. The design also has five C-shaped slots internal to the U-shaped extrusion, which are used for mounting dye-cast aluminum end covers with thread forming screws. The top side of the extrusion has top "T" slots which accept a standard hex nut or hex bolt head. The top "T" slots are used for mounting a stamped sheet metal cover which holds the individual pumps. A seal groove is provided around the top side of the extrusion for accepting a square or round elastomer seal between the top surface and the cover. Side "T" slots are provided on an outside surface of a side of the extrusion for wall mounting of the box reservoir or for mounting of accessory items. The bottom of the reservoir has two "T" slots which accept extruded mounting feet or anchors. These feet are extruded with a "T" portion offset (4° angle) with respect to the "T" slots to provide a locking engagement into the T-slots when the feet are bolted to a mounting surface. These feet can also be used with the side "T" slots for wall mounting the box.

The end covers are die-cast, complete with seal grooves for accepting seals, and bolt holes for mounting a cover to each end of the extrusion. The tops of the end covers have T-shaped protruding "keys" which fit into the extrusion top "T" slots to provide alignment and rigidity to the assembly. Since the drive shaft location can be located in any of four positions on either end of the reservoir, a machining operation is required in the die-cast end covers.

The cam input drive shaft blind end, as well as the main cam shaft, will be supported, every two to three pump stations, by an extruded aluminum "a" shaped support which partially slides into the guideways in the bottom of the extrusion. Once located, set screws protruding through feet of the supports, lock the supports into place. Two different style support extrusions are required for the support as shafts can be either high or low throughout the box.

Another costly and critical area of the box lubricator is the main cam shaft which runs the entire length of the reservoir and contains the cams for stroking the pumps (from 1 to 45 pumps). Since this shaft is usually manufactured from steel bar stock, the end bearings and center support bearings had to be aligned to prevent binding. An additional feature of the present invention is to provide a powder metal cast cam component including a short shaft section and a cam lobe as one piece. At assembly, the individual cam components are stacked up axially (horizontally) as required. These individual cam components with short shafts eliminate the alignment problem as the slip fit of the stack up provides enough slop to take up bearing location variations.

Applicants have hereby provided an improved housing for a box lubricator. The box lubricator, by providing T-shaped channels for mounting the top cover to the housing, or for mounting the lubricator box to a horizontal or vertical exterior structure, makes assembly of the lubricator box or installation of a lubricator box time saving and cost efficient. By providing C-shaped screw channels for mounting end covers to the U-shaped housing, Applicants have provided an effective and time saving method of assembling the end covers to the U-shaped housing. Additionally, the use of the T-channels and the screw receiving channels provide the inventive advantage that the U-shaped extrusion can be custom cut for a particular length without losing the effectiveness of the channels for mounting the top cover, the channels for mounting the box to a horizontal or vertical structure, or the screw channels for mounting the end covers. The T-shaped channels and the screw receiving channels are effective regardless of where the cut is made. Also, by providing the guideways for receiving the cam shaft supports and by fashioning the cam shaft supports to be slidable along the guideways and anchorable at selective positions within the box, Applicants have provided a cost effective and selectively adjustable method of locating cam supports anywhere within the lubricator box, and have also provided a housing extrusion which can be cut to any length without losing the effectiveness of the arrangement for supporting the cam supports, the guideways. Again, the housing can be cut to any length.

BRIEF DESCRIPTION OF THE DRAWINGS

FIG. 5 is a front elevational view of the floor mounting bracket shown in FIG. 4;

FIG. 7 is a front elevational view of an end cover as shown in FIG. 1;

FIG. 8 is a sectional view taken generally along line VIII—VIII of FIG. 7;

FIG. 9 is a back side elevational view of the cover shown in FIG. 7;

FIG. 10 is a top plan view of the cover shown in FIG. 9;

FIG. 11 is a front elevational view of a idler shaft-/cam shaft bearing-support as shown in FIG. 3;

FIG. 12 is a front elevational view of a cam shaft bearing-support from FIG. 2;

FIG. 13 is a partial sectional view of a cam shaft component from FIG. 2;

FIG. 14 is a left side elevational view of the cam shaft component of FIG. 13;

FIG. 15 is a right side elevational view of the cam shaft component of FIG. 13;

FIG. 17 is a rear elevational view of the box lubricator as shown in FIG. 16.

DETAILED DESCRIPTION OF THE PREFERRED EMBODIMENTS

Figure 1:
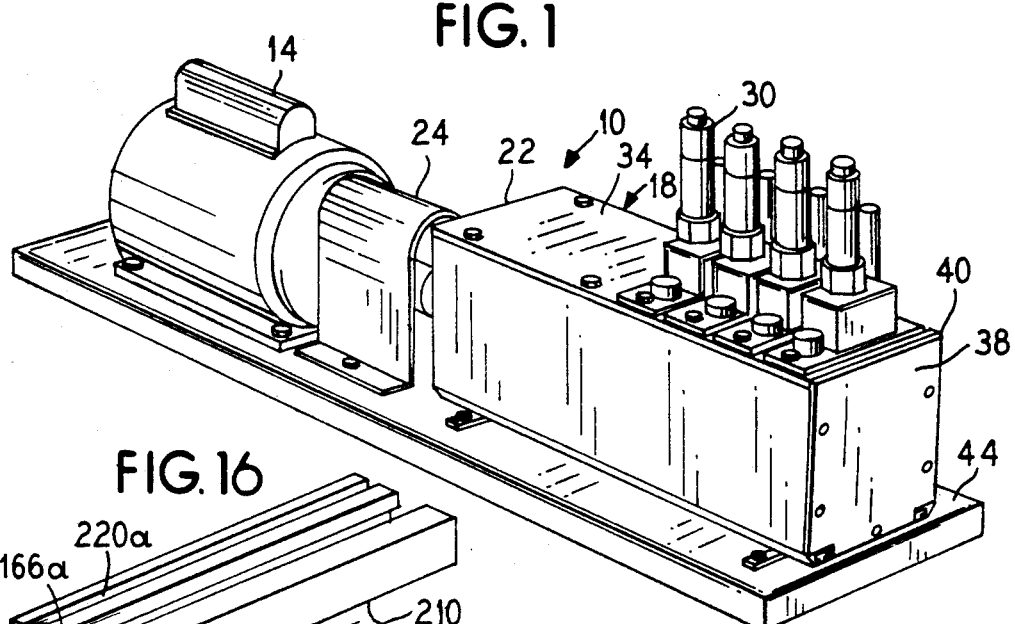
FIG. 1 is a perspective view of a driver-lubricator box-pump arrangement application of the present invention.

FIG. 1 shows a lubrication system 10 having a rotating driver 14 having an output shaft (not shown) coupled to an input shaft 16 (shown in FIG. 2) of a lubricating box 18. The input shaft 16 pierces the box 18 at a front end 22 thereof. A safety shield 24 covers the coupling between the rotating driver 14 and the input shaft 16 of the lubricator box 20.

The lubricator box 18 mounts thereon a series of lubrication pumps 30 aligned in a row and penetrating a top cove 34 of the lubricator box 18. A rear cover 38 is shown attached to a rear side 40 of the lubricator box 18. The rotating driver 14, the shield 24 and the lubricator box 20 are shown bolted onto a platform 44.

Figure 2:
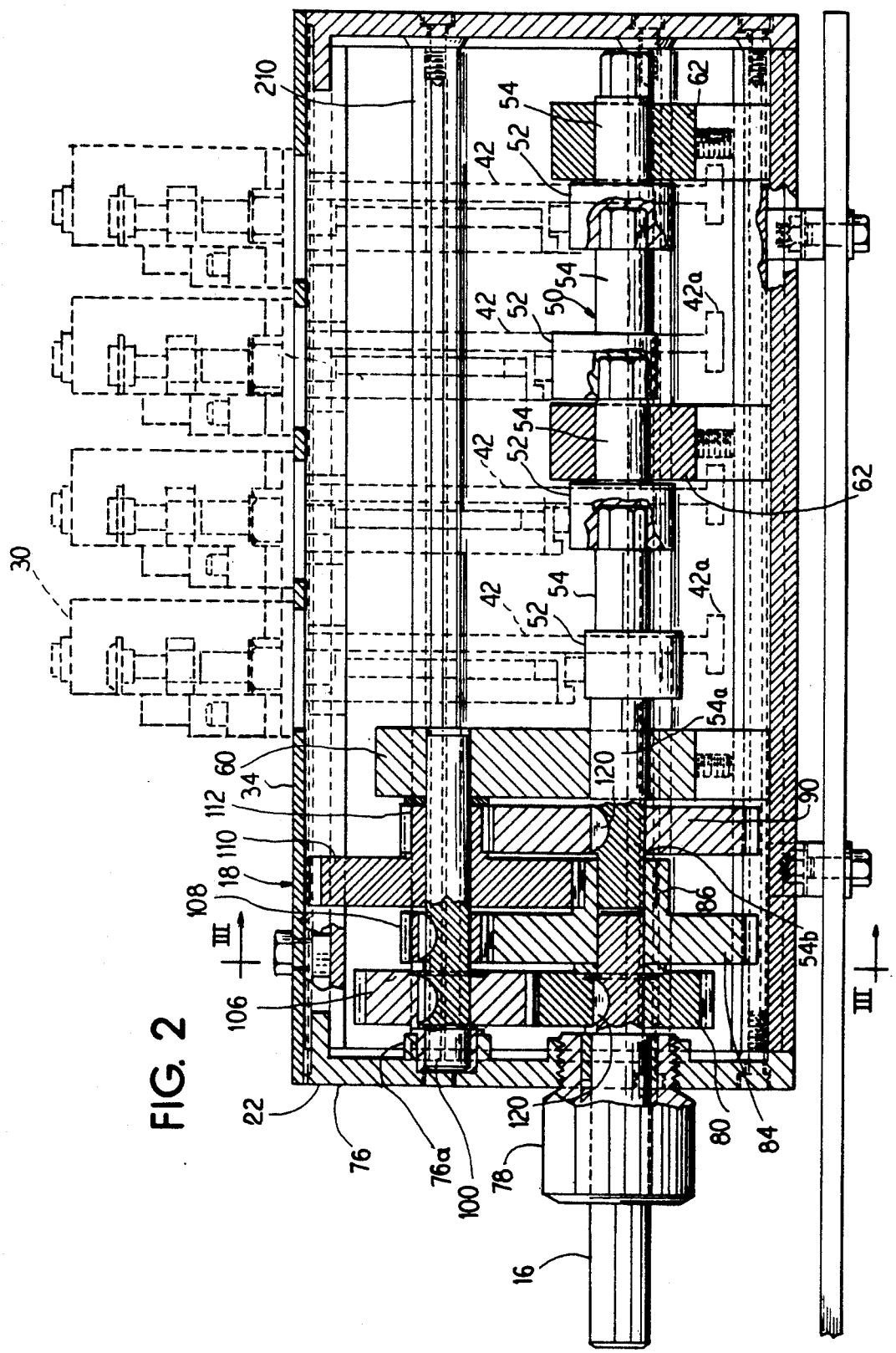
FIG. 2 is a longitudinal cross sectional view of the lubricator box shown in FIG. 1.

FIG. 2 shows the inner workings of the lubricator box 18. The lubricator box 18 acts as a reservoir and contains an inventory level of lubricating oil (not shown). The pumps 30 are reciprocating-type pumps, vertically aligned through the top cover 34 of the lubricator box 18. Each pump 30 has a suction tube 42 having an inlet 42a located below the inventory level of the lubricating oil held within the lubricating box 18. Each pump 30 has a reciprocating mechanism shown generally at 48 in FIG. 3 for imparting up and down motion to a reciprocal pump actuating lever 50 shown in FIG. 3.

Within the lubricating box 18 there is held a cam shaft assembly shown generally at 50. The cam shaft assembly 50 comprises a plurality of cam lobes 52 on which ride the reciprocating mechanisms 48 for each pump 30. Each cam lobe 52 is held on a shaft section 54. The shaft sections 54 are aligned axially throughout the lubricator box 18 and the cam lobes 52 are mounted in eccentric fashion to this axis. The cam shaft assembly 50 is rotatably held by a front support 60 and two cam supports 62. The front support 60 and the cam supports 62 have journals (described below) aligned axially with said cam shaft assembly 50 and hold some of said shaft sections in rotating fashion.

At the front end 22 of the lubricator box through a front cover 76 is threadingly mounted a casing journal 78 which rotatingly holds the input shaft 16 therethrough, piercing the front cover 76. The input shaft 16 mounts thereon a first gear 80 in keyed fashion. Proceeding inwardly of the box the input shaft 16 holds rotatably thereon a second gear 84. The input shaft 16 itself terminates at the inward face of the second gear 84. The second gear 84 is connected to a third gear 86 as an integral part thereof. A cam input shaft 54b proceeds from a first cam lobe 52 toward the input shaft 16 and is rotatably held within the third gear 86. A fourth gear 90 is held in key fashion onto the cam input shaft 54b, located between the third gear 86 and the front support 60.

Located above the input shaft 16 and the cam input shaft 54b and the cam shaft assembly 50 is an idler shaft 100. The idler shaft 100 is journaled into an inwardly directed bearing formation 76a on the front cover 76 at one end, and supported in the front support 60 at an opposite end thereof. The idler shaft 100 is arranged axially parallel to the input shaft 16. From the front formation 76a proceeding inwardly, there is aligned on the idler shaft a fifth gear 106, a sixth gear 108, a seventh gear 110, and an eighth gear 112. The fifth and sixth gears are keyed into the idler shaft and rotate therewith. The seventh and eighth gear are formed together, rotate together, and are not keyed into the idler shaft, that is, rotate freely about an axis of said idler shaft.

By selective sizing of the first gear through the eighth gear, a speed reduction can be accomplished between the rotating speed of the input shaft 16 and the rotating speed of the cam input shaft 54b. Particularly, the first gear 80 is engaged to the fifth gear 106, the second gear 84 is engaged to the sixth gear 108, the third gear 86 is engaged to the seventh gear 110, and the fourth gear 90 is engaged to the eighth gear 112. The sixth gear 108 is sized having a smaller diameter than the second gear 84. The third gear 86 is sized having a smaller diameter than the seventh gear 110, and the eighth gear 112 is sized having a smaller diameter than the fourth gear 90. The fourth gear 90 being keyed into the cam input shaft 54b, causes the reduced speed at the cam shaft assembly 50. In effect, the combinations of small diameter gears linked with large diameter gears causes an incremental cascading downward of the speed from the speed of the first shaft 16 to the speed of the cam input shaft 54b. The first gear 80, the fourth gear 90, the fifth gear 106 and the sixth gear 108 are keyed into their respective shafts using keys 120.

In order to offer the popular cam shaft speeds of approximately 45:1, 120:1, and 300:1, gear sets for the ratio of 2.6:1 are selected. In order to reduce costs, powder metal gears are utilized. This reduces part costs and eliminates the need to press in bronze bushings.

Figure 3:
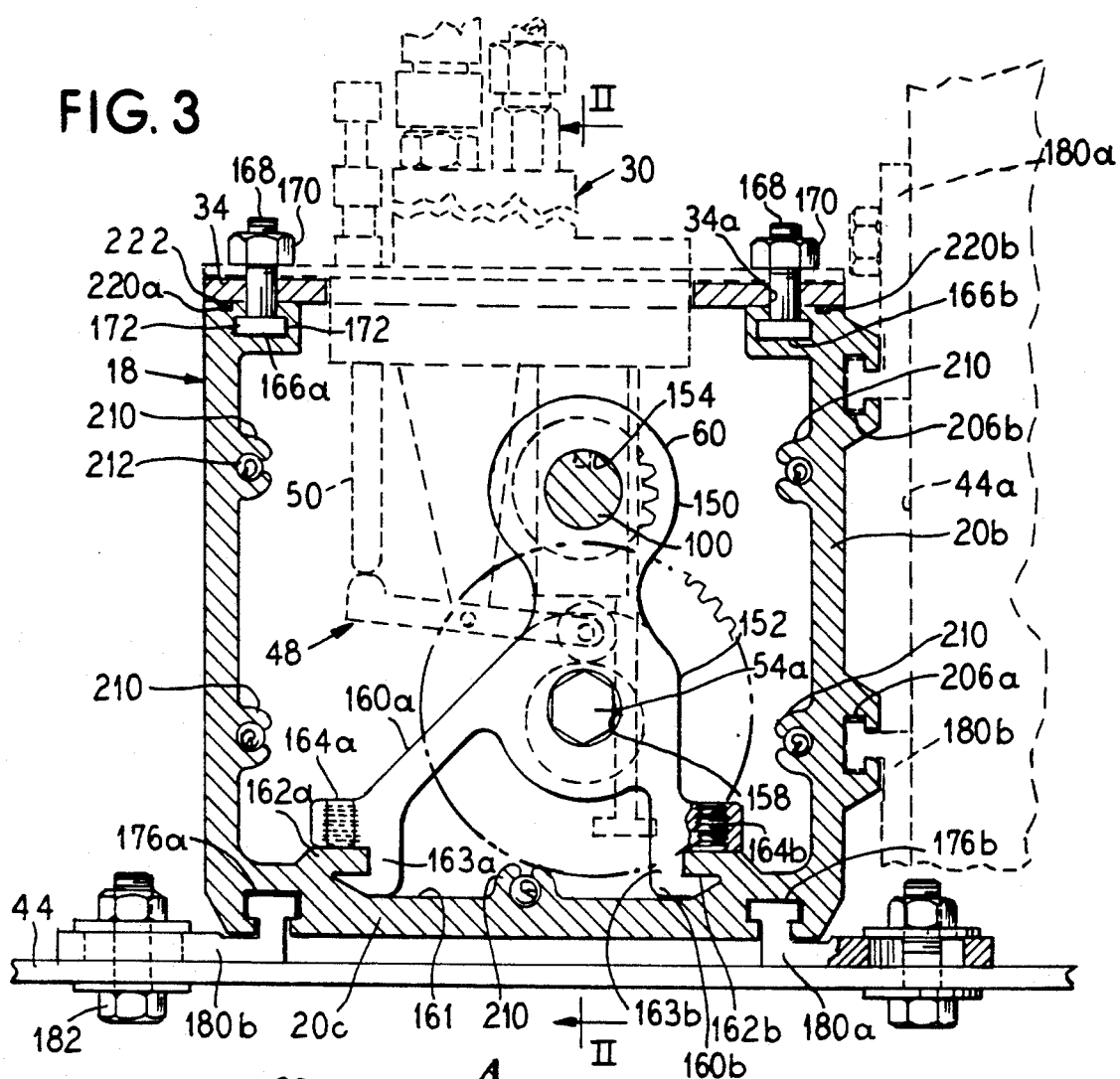
FIG. 3 is a cross sectional view through the lubricator box shown in FIG. 2, taken generally along line III—III.

FIG. 3 shows the front support 60 having a top section 150 supported on a bottom section 152. The top section 150 provides therethrough a first journal 154 for holding the idler shaft 100 therethrough. The bottom section 152 provides a second journal 158 for journaling the cam shaft sections 54 therethrough.

The bottom section 152 further provides a first leg 160a, and a second leg 160b which are supported off an inside surface 161 of a bottom wall 20c of the housing 20. The inside surface 161 provides a first rail 162a and a second rail 162b arranged in parallel and projecting inwardly toward each other and extending in parallel fashion with respect to the bottom wall 20c. The first leg 160a provides a first fork 163a, and the second leg 160b provides a second fork 163b. The first fork 163a and the second fork 163b are directed outwardly away from each other and are arranged to slide on and interengage with the first rail 162a and the second rail 162b respectively. The first leg 160a and the second leg 160b provide a first set screw 164a and a second set screw 164b for anchoring the first fork 163a and the second fork 163b to the first rail 162a and the second rail 162b, through threaded apertures 165a, 165b respectively.

Figure 16:
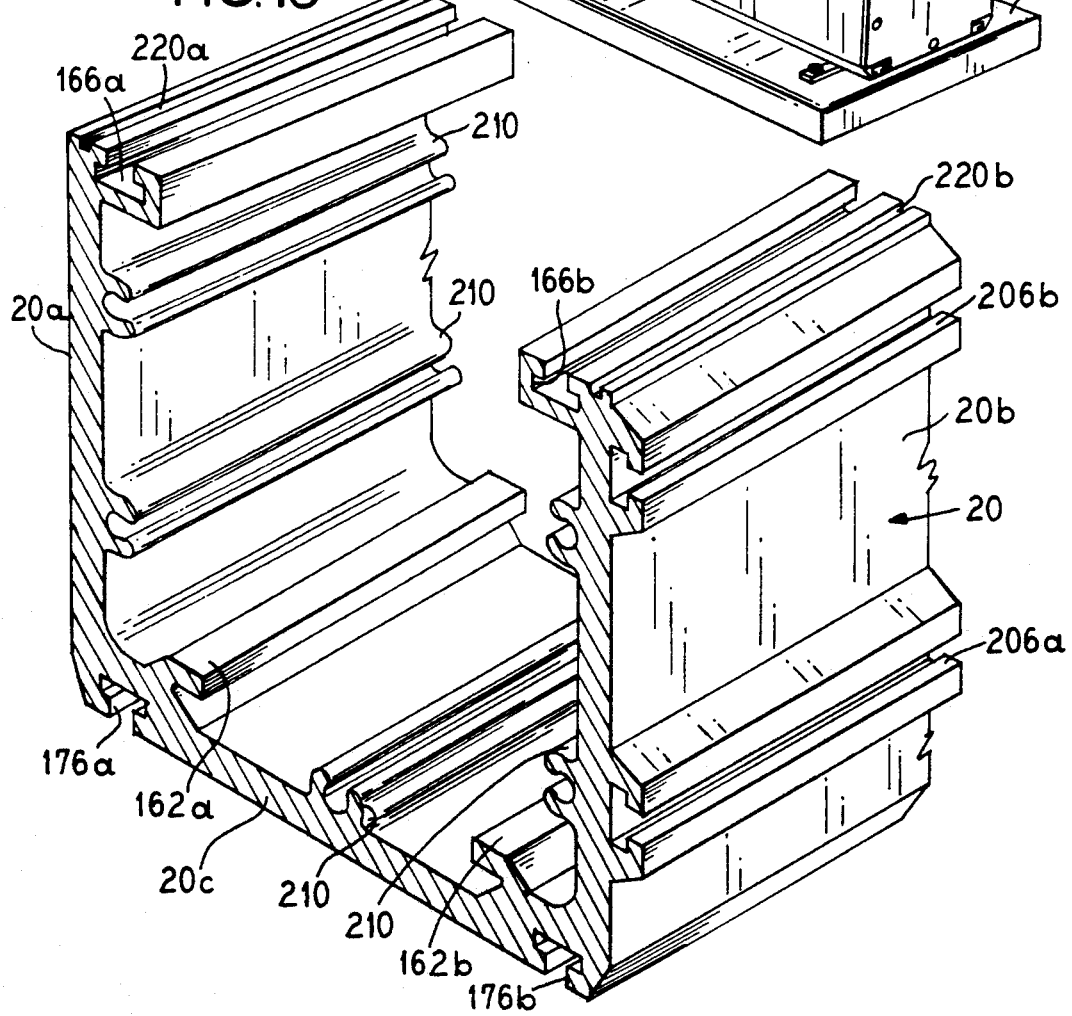
FIG. 16 is a partial perspective view of a U-shaped component of the lubricator box of FIG. 1.

As shown in FIGS. 3, 16 and 17, the box 18 comprises a generally U-shaped housing 20 having side walls 20a, 20b and the bottom wall 20c, arranged upwardly open and closed with the top cover 34. For holding the top cover 34 onto the U-shaped housing 20, parallel bolt channels 166a, 166b (shown in FIG. 17) which hold, selectively located along their length, hex head bolts 168 carrying nuts 170 for clamping down the top cover 34. The hex head bolt 168 fit snugly along flat sides 172 against lateral sides of the channels 166a, 166b so that rotation of the hex head bolt 168 is prevented by the channels. The hex head bolts 168 are slid into position through an open end of the bolt channels 166a, 166b and spaced into proper position for receiving thereupon the cover 34, particularly through bolt apertures 34a located through the covers 34.

Figure 4:
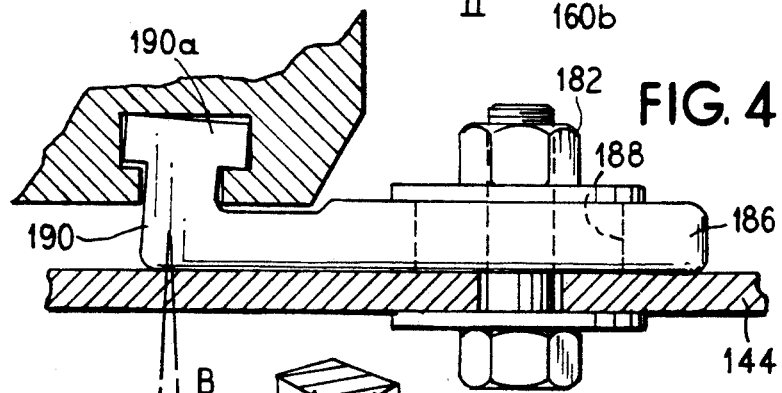
FIG. 4 is an enlarged view of a floor mounting detail shown in FIG. 3.

Along the bottom wall 20c of the U-shaped housing 20, arranged in parallel spaced apart fashion are two receiving channels 176a, 176b (shown in FIG. 17). These receiving channels 176a, 176b are for anchoring the U-shaped housing 20 to the platform 44. Two base anchors 180a, 180b are shown bolted to the platform 44 with hex head bolts 182. The base anchors 180a, 180b are shown in FIGS. 3, 4, and 5. The receiving channels 176a, 176b have generally T-shaped cross sections and extend longitudinally along the housing 20, on either lateral side of the bottom wall 20c.

The base anchors 180a, 180b are generally bar-shaped having a bolt receiving flat portion 186, and having an aperture 188 therethrough for receiving the hex head bolt 182 to anchor the flat portion 186 to the platform 44. At an end opposite to the hex head bolt 182, the flat portion 186 is turned away from the platform 44, forming a T-shaped prong 190. The T-shaped prong 190 is compatible in cross sectional shape to the receiving channel 176a, 176b. The prong 190 is turned away from the platform 44, past a perpendicular orientation by an angular amount β. In the preferred embodiment β=4. Thus the T-shaped prong grippingly locks within the receiving channel 176a, 176b providing a resilient fit. A head portion 190a of the prong 190 is therefore "cocked" with respect to the receiving channel 176a, 176b.

As an alternate method of mounting the housing 20 to a structure, side channels 206a, 206b are provided which are similar in configuration to the receiving channels 176a, 176b. The base anchors 180a, 180b can therefore be bolted to a vertical surface 44a, and the housing 20 supported at the side 20b.

The bolt channels 166a, 166b, the receiving channels 176a, 176b, and the side channels 206a, 206b can all be fashioned of identical "T" cross sectional shapes for either receiving base anchors 180a, 180b or hex headed bolts 168, depending on the particular application.

Figure 6:
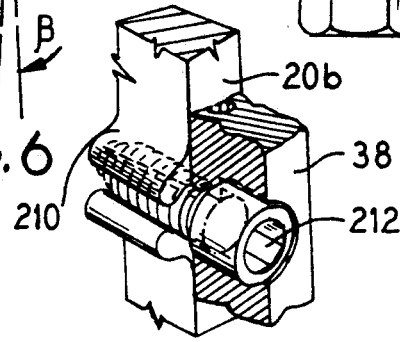
FIG. 6 is a partial perspective view of a screw arrangement shown in FIG. 3.

Arranged in a spaced apart grid along the sides 20a, 20b of the U-shaped housing 20 are longitudinal screw holding channels 210. The screw holding channels 210 proceed inwardly from the side walls 20a, 20b with a C-shaped cross section. At least one screw holding channel 210 is located in the bottom wall 20c of the U-shaped housing 20 facing away from the inside surface 161. The screw holding channels 210 receive the threaded portion of machine screws 212 which clamp the end cover 38 and the front cover 76 to the U-shaped housing 20. FIG. 6 shows the end cover 38 being clamped to the side wall 20b by a machine screw 212 proceeding partially through the screw holding channel 210. The screw holding channel 210 is formed to have a central passage slightly smaller than a diameter of the machine screw 212 such that threading of the machine screw 212 therethrough resiliently opens up the channel 210 providing a convenient and easy method of screwing the cover 38 onto the U-shaped channel 20.

FIG. 3 shows that the top cover 34 also provides an outwardly facing channel 220a, 220b for holding a seal thereinto on a top of each side wall 20a, 20b of the U-shaped housing 20. The seal 222 proceeds along each side 20a, 20b and around the front cover 76 and the rear cover 38 (described below) to be sealingly clamped down by the top cover 34 when the hex head bolts 168 are tightened up.

FIGS. 7–10 describe the rear cover 38 which is similar to the front cover 76 except with regard to the shaft penetrations and journal formations present in the front cover 76.

FIG. 7 shows the rear cover 38 having five countersunk screw head receiving holes 230, arranged spaced apart in a grid fashion along sides and a bottom of the rear cover 38. The rear cover 38 has cut-out corners 232a, 232b to provide non-interference for the receiving channels 176a, 176b, for receiving in sliding fashion the anchors 180a, 180b.

FIG. 8 shows that the screw holes 230 have built up cone portions 236 proceeding inwardly toward the U-shaped housing 20. A cover flange 240 is provided at a top of the rear cover 38 which has a width which allows the cover flange 240 to proceed between the channels 166a, 166b when the rear cover 38 is assembled to the U-shaped housing 20. The flange 240 assists in aligning the rear cover 38 onto the U-shaped housing 20. Arranged proceeding inwardly on either side of the flange 240 are alignment tab 242a, 242b which have inverted T-shapes which fit snugly within the channels 166a, 166b when the rear cover 38 is brought up properly against an end of the U-shaped channel 20. The insertion of the tabs 242a, 242b helps align the rear cover 38 and provides rigidity to the assembly.

Arranged around a top of the rear cover 38 is a seal groove 244 which holds a seal between the rear cover 38 and the top cover 34. A continuous seal can then be circumscribed around the housing 20 and the rear cover 38 and the front cover 76 by placing a ring seal around the grooves 220a, 220b and the seal groove 244 of the end cover 38 and a similar seal around the front cover 76.

Around an inside face 248 of the rear cover 38 is a lateral seal channel 250 which conforms to a general U-shape and is resiliently clamped against an end face of the U-shaped housing 20 when the rear cover 38 is attached to the housing 20.

FIG. 12 shows a configuration of the cam support 62 which is similar to the bottom section 160b of the front support 160 as shown in FIG. 11. The cam support 62 has a first leg 260a and a second leg 260b having a first fork 262a and a second fork 262b respectively and said forks are outwardly facing to engage the first rail 162a and the second rail 162b respectively. Set screws are provided to threadingly engage through threaded apertures 263a, 263b provided through the first fork 262a, 262b respectively to lock the cam support 262 to the first and second rails 162a, 162b respectively.

FIG. 13 shows an inventive arrangement for the cam shaft assembly 50. To provide some flexibility of alignment along the length of the cam shaft without requiring precision aligning techniques through the series of supports 60, 62, the cam shaft is designed to be a multi-component shaft rather than a single shaft. One cam component 50a is shown in FIG. 13. The cam component 50a comprises the cam lobe 52 mounted eccentrinsically to the shaft section 54. The shaft section comprises a hexagonal protrusion 290. The cam lobe 52 provides a hexagonal bore 292 identical in shape but slightly oversized when compared to the hexagonal protrusion 290. Thus, an identical cam component 50a can be inserted into the shown cam component 50a with its cam protrusion 290 fitted within the cam bore 292 in horizontal stacking fashion. Because the hexagonal protrusion 290 is relatively closely fit within the hexagonal bore 292, the two cam components must rotate together.

Because of this inventive arrangement, cam components 50a normally manufactured from steel bar stock with the end bearings and center support bearings aligned carefully to prevent binding, can now be powder metal cast with the shaft section 54 and the cam lobe 52 fashioned in one piece. At assembly, the individual components 50a are stacked up as required for the required number of pumps 30 and the required length of the housing 20. The individual cam components 50a with their relatively short shaft sections 54 eliminate alignment problems as the slip fit of the stack up provides enough slop to make up bearing location variations.

Although the present invention has been described with reference to a specific embodiment, those of skill in the art will recognize that changes may be made thereto without departing from the scope and spirit of the invention as set forth in the appended claims.

We claim as our invention:

1. A box lubricator comprising:
   at least one lubrication pump having a suction tube, a reciprocating lever for pumping liquid into said suction tube, and an outlet;
   a U-shaped housing;
   a front cover;
   a rear cover;
   a top cover, said front cover, rear cover, U-shaped housing and said top cover assembled together forming a box shape, said pump mounted to said top cover and taking suction from within said U-shaped housing;
   means for imparting reciprocating movement to said lever, said means partially located within and supported by said U-shaped housing; and
   said U-shaped housing having a mounting channel formed thereon extending the length of said U-shaped housing and providing means for receiving a fastener to fashion at least one of said top cover, said front cover, and said rear cover to said U-shaped housing.

2. The box lubricator according to claim 1, wherein said U-shaped housing further comprises at least one external channel open in an outward direction of said U-shaped housing extending along a length of said housing and fashioned to receive a fastener to fasten said U-shaped housing to external structure.

3. The box lubricator according to claim 1, wherein said U-shaped housing comprises a plurality of C-shaped channels facing inwardly of said U-shaped housing and arranged to receive threaded shanks of attachment screws for mounting said front cover and said rear cover to ends of said U-shaped housing.

4. The box lubricator according to claim 1, wherein said at least one mounting channel comprises two outwardly directed channels having inverted T-shaped cross sectional shapes for receiving a hexagonal bolt head snugly therein for mounting said top cover to said U-shaped housing with a plurality of bolts.

5. The box lubricator according to claim 1, wherein said means for imparting reciprocating movement comprises a cam shaft assembly having a longitudinal cam shaft holding at least one cam lobe, said cam lobe engageable to said reciprocating lever, rotation of said cam lobe causing reciprocal movement of said reciprocating lever; and
   at least one cam support having a journal for holding said cam shaft therein and a leg for supporting said cam shaft from said U-shaped housing; and
   wherein said U-shaped housing provides at least one rail, said leg of said support engageable to said rail at an arbitrarily selectable position along said rail.

6. A box lubricator comprising:
   at least one lubrication pump having a suction tube, a reciprocating lever for pumping liquid into said suction tube, and an outlet;
   a U-shaped housing;
   a front cover;
   a rear cover;
   a top cover, said front cover, rear cover, U-shaped housing and said top cover assembled together forming a box shape, said pump mounted to said top cover and taking suction from within said U-shaped housing;
   means for imparting reciprocating movement to said lever, said means partially located within and supported by said U-shaped housing;
   said U-shaped housing having a mounting channel formed thereon extending the length of said U-shaped housing and providing means for receiving a fastener to fashion at least one of said top cover, said front cover, and said rear cover to said U-shaped housing;
   wherein said means for imparting reciprocating movement comprises a cam shaft assembly having a longitudinal cam shaft holding at least one cam lobe, said cam lobe engageable to said reciprocating lever, rotation of said cam lobe causing reciprocal movement of said reciprocating lever; and
   at least one cam support having a journal for holding said cam shaft therein and a leg for supporting said cam shaft from said U-shaped housing;
   wherein said housing comprises two rails formed on an inside surface of a bottom of said U-shaped housing; and
   said cam support comprises a first leg and a second leg, said first leg and said second leg each having a fork portion, each said fork portion engaged over one rail, said fork portions providing a set screw to lock said fork portions onto said rails said legs engaged to said rails at a selected position along said rails.

7. The box lubricator according to claim 6, wherein said means for imparting reciprocal movement comprises a plurality of gears for speed reduction and an idler shaft holding some of said gears, said idler shaft arranged above said cam shaft; and
    wherein said cam support further provides a second journal for rotatingly holding said idler shaft therein.

8. The box lubricator according to claim 1, wherein said U-shaped housing further comprises "T" shaped mounting channels arranged on a bottom side thereof on an external side of said U-shaped housing; and
    base anchors, said base anchors having a substantially flat portion with a bolt receiving hole therethrough and a T-shaped turned end portion sized and configured to slidably insert through said mounting channels.

9. The box lubricator according to claim 8, wherein said T-shaped turned portion is cocked at an angle of 4° from the orientation of the T-shaped receiving channels to provide a resilient interference fit within said "T" shaped mounting channels.

10. The box lubricator according to claim 1, wherein said U-shaped housing comprises an aluminum extrusion.

11. A box lubricator comprising:
    an enclosed housing holding a supply of lubricating liquid therein;
    at least one lubricating pump mounted to said housing and penetrating therethrough with a suction tube and a reciprocation actuator for imparting pumping action within said pump;
    rotating means for imparting reciprocating movement to said reciprocating actuators, said means located and supported within said housing; and
    channel means having a trough extending along the length of said housing for receiving fasteners into the trough for anchoring said housing to external structure.

12. The box lubricator according to claim 11, wherein said channel means are located on a bottom of said housing and said external structure is a horizontal surface.

13. The box lubricator according to claim 11, wherein said channel means are mounted along a side of said housing and said external surface is a vertical structure.

14. The box lubricator according to claim 11, wherein said trough is T-shaped in cross section and each of said fasteners is a bar member with a turned end having a T-shaped cross section, said bar member bolted to said external structure.

15. The box lubricator according to claim 14, wherein said T-shaped turned end is cocked relative to the T-shaped cross section of said trough forming an interference fit between said trough and said turned end.

16. The box lubricator according to claim 11, wherein said channel means are arranged both on a bottom of said housing and on one side of said housing providing alternate locations for mounting said housing either to a horizontal structure or to a vertical structure.

17. A box lubricator comprising:
    at least one lubrication pump having a suction tube, a reciprocating lever for pumping liquid into said suction tube, and an outlet;
    a housing;
    a cam shaft assembly disposed longitudinally of said housing and having a cam lobe mechanically communicating to said reciprocating lever;
    at least one cam support having a journal for holding said cam shaft therein and a leg for supporting said cam shaft from said housing; and
    wherein said housing provides at least one rail, said rail disposed longitudinally along an inside of said housing, said leg of said support engageable to said rail at an arbitrarily selectable position along said rail.

18. The box lubricator according to claim 17, wherein said housing comprises a second rail arranged on an inside of said housing longitudinally of said housing, and said cam support provides a second leg, said second leg engaged to said second rail at an arbitrarily selectable position along said second rail.

19. The box lubricator according to claim 18, wherein said leg and said second leg provide forked portions at a bottom end thereof, said forked portions providing a set screw to lock said forked portions onto said rail and said second rail.

20. The box lubricator according to claim 17, wherein said box lubricator further comprises a plurality of gears engageable with said cam shaft for cam shaft speed reduction and an idler shaft holding some of said gears, said idler shaft arranged above said cam shaft; and
    wherein said cam support further provides a second journal for rotatingly holding said idler shaft therein.

21. A box lubricator comprising:
    an enclosed housing holding a supply of lubricating liquid therein;
    a plurality of lubricating pumps mounted to said housing and penetrating therethrough with suction tubes and reciprocation actuators for imparting pumping action within said pumps;
    a plurality of cam shafts, each cam shaft having a cam lobe communicating with one reciprocation actuator and a shaft portion, said shaft portions aligned axially, a front end of each shaft portion providing a coupling means to engage a back end of a next adjacent cam shaft, said cam shafts thereby longitudinally stackable.

22. The box lubricator according to claim 21, wherein said coupling means comprises a male member having at least one flat side insertable into a socket arranged at a back end of said next adjacent cam shaft.

23. The box lubricator according to claim 22, wherein said male member comprises a polygon cross section and said socket comprises a similar shaped polygon cross section slightly larger than said polygon cross section of said male member.

24. The box lubricator according to claim 21, wherein said cam shaft comprises a powder metal casting.

* * * * *